United States Patent [19]

Schmidt et al.

[11] 4,232,134

[45] Nov. 4, 1980

[54] PROCESS FOR ISOLATING BORON-CONTAINING PHENOL/FORMALDEHYDE RESINS

[75] Inventors: Manfred Schmidt; Eberhard Bandtel, both of Krefeld; Walter Traudisch, Leverkusen; Georg Spott; Dieter Freitag, both of Krefeld, all of Fed. Rep. of Germany

[73] Assignee: Bayer Aktiengesellschaft, Fed. Rep. of Germany

[21] Appl. No.: 91,823

[22] Filed: Nov. 6, 1979

[30] Foreign Application Priority Data

Nov. 11, 1978 [DE] Fed. Rep. of Germany ....... 2849115

[51] Int. Cl.$^3$ .......................... C08G 8/10; C08G 8/20; C08G 8/28

[52] U.S. Cl. .................... 525/506; 260/19 R; 260/19 N; 260/19 UA; 525/508; 528/129; 528/153; 528/502

[58] Field of Search ................ 525/506; 528/129, 153, 528/502

[56] References Cited

U.S. PATENT DOCUMENTS

| | | | |
|---|---|---|---|
| 4,073,757 | 2/1978 | Schmidt et al. | 528/129 X |
| 4,182,697 | 1/1980 | Schmidt et al. | 525/506 |

*Primary Examiner*—Howard E. Schain
*Attorney, Agent, or Firm*—Connolly and Hutz

[57] ABSTRACT

Boron containing phenol/formaldehyde resins can be isolated from their reaction media by evaporating said resins in a spiral flow evaporator which has a ratio between throughput and tube cross section from 0.1 to 1.5 and a ratio between throughput and evaporation surface from 100 to 400.

9 Claims, 1 Drawing Figure

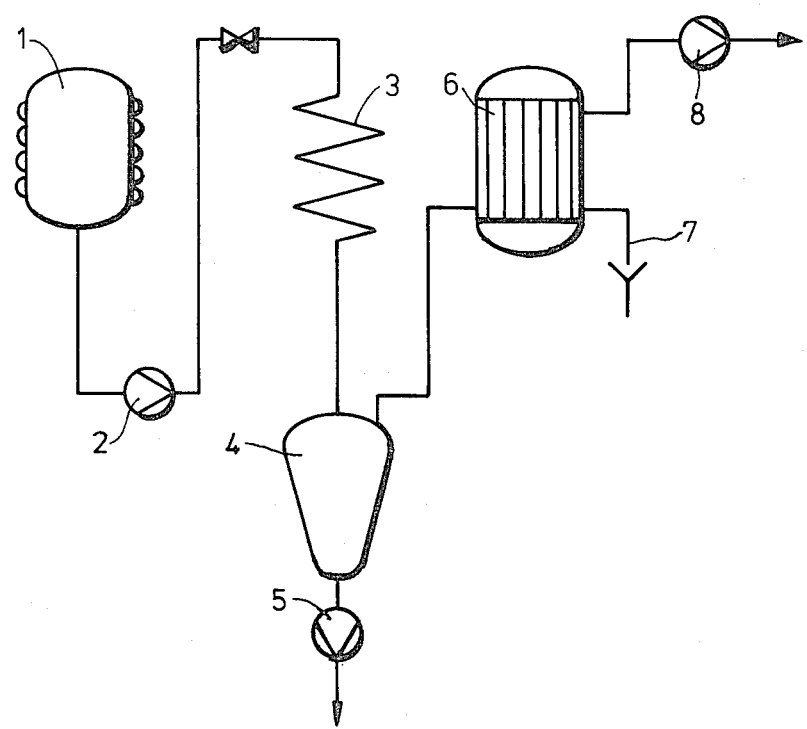

PROCESS FOR ISOLATING BORON-CONTAINING PHENOL/FORMALDEHYDE RESINS

This invention relates to a process for isolating boron-containing phenol/formaldehyde resins from their reaction media.

German Offenlegungsschrift No. 2,557,613 describes boron-containing phenol/formaldehyde resins which may be produced by partly reacting a novolak with boron compounds, accompanied or followed by reaction with unsaturated fatty acids.

These resins may be represented by the following general formula:

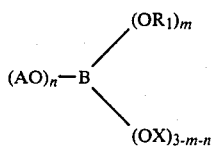

wherein m and n which may be the same or different represent a value of from 1 to 2, with the proviso that $$m+n \leq 2,$$

A represents a $C_1$–$C_4$ alkyl group, such as methyl, ethyl, propyl, butyl, isopropyl, isobutyl, $R_1$ has the same meaning as A or X, and X represents a novolak which is formed by condensing an aldehyde with a diphenylol alkane or a mixture of one or more diphenylol alkanes, hydroxy phenyl-hydroxy indane isomers and hydroxy phenyl-hydroxy chromane isomers on the presence of one or more acid catalysts, which novolak still contains one or more free phenolic OH-groups and an unsaturated fatty acid preferably containing from 12 to 36 carbon atoms, or mixtures thereof, in co-condensed form.

The boron-containing resins are soluble in methanol, ethanol, propanol, isopropanol, butanol, isobutanol, dioxane, tetrahydrofuran, acetone, methyl ethyl ketone, ethyl acetate, butyl acetate, methyl and ethyl glycol acetate, have an iodine number of from 80 to 200, preferably from 110 to 170, and an OH number of from 200 to 500, preferably from 240 to 450, and contain up to 7% by weight, preferably from 1.5 to 5% by weight of boron. The resins have softening points in the range of from 50° to 150° C., preferably in the range of from 55° to 110° C.

After the reaction to form the boron-containing resins, the reaction medium consists of the end product obtained, the starting compounds used and the solvents used.

As described in detail in German Offenlegungsschrift No. 2,557,613, reaction products of diphenylol alkanes, of the type mentioned, for example, in German Auslegeschrift No. 1,235,894, hydroxy phenyl-hydroxy indanes or mixtures thereof with aldehydes are used as the starting products (novolaks). Other starting products are fatty acids or their esters, boron trioxide, boric acid and also boric acid alkyl esters corresponding to the following general formulae:

$$B(OR)_3, \quad HO-B(OR)_2, \quad (HO)_2B-OR$$

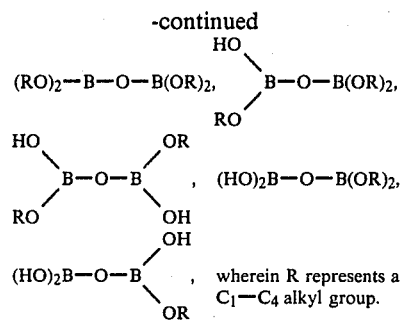

wherein R represents a $C_1$–$C_4$ alkyl group.

Another component of the reaction medium consists of the solvent used during the reaction, such as benzene, toluene, xylene, ethyl acetate, butyl acetate, methyl glycol or ethyl glycol acetate and also alcohols containing from 1 to 4 carbon atoms.

The boron-containing phenol/formaldehyde resins may be isolated (a) by concentrating the resin solution by evaporation in the reaction vessel and running off the liquid resin melt, (b) by concentrating the resin solution by evaporation in an evaporation screw, and also (c) by concentrating the resin solution by evaporation in a spiral flow evaporator all three methods being equally effective.

The phenol/formaldehyde resins modified with boric acid esters may be used as reinforcing resins for rubbers. To this end, they are worked into rubber at an elevated temperature in the presence of a formaldehyde donor, such as hexamethylene tetraamine, paraformaldehyde, trioxy-or tetra oxy methylene, on the mixing units normally used for processing rubber, such as mixing rolls, kneaders, and high-speed mixers.

The valuable properties, however, of the phenol/formaldehyde resins modified with boric acid esters, namely their high temperature-resistant hardening activity in various rubbers, coupled with an increase in structural strength, and the fact that they can be universally used in various synthetic rubbers, such as NBR, SBR, EPDM, BR, CR and NR, are only optimally reached when it is possible, on the one hand, to remove the solvent used during production as completely as possible and, on the other hand, to esterify the boron compound used as quantitatively as possible into the novolak without reducing its advantageously high reactivity through partially crosslinking condensation attributable to prolonged thermal stressing.

Thus, it has been found that it is impossible, in view of the high reactivity of the trifunctional boric acid ester compounds, to isolate the resin substantially free from solvent and uncrosslinked in a commercial batch of economically reasonable size by concentration through evaporation in the reaction vessel. On account of the prolonged distillation times for the solvent, it is necessary in order to avoid crosslinking through prolonged temperature stressing to prematurely isolate the resin from the reaction vessel without it being possible to completely remove the solvent. As a result, the advantageous properties of the resin are not optimally reached and instead, hardened rubber materials having lower hardness values are obtained. The resins thus obtained are not sufficiently stable in storage. They gradually sinter together, lose the form in which they are prepared for processing and, upon incorporation into the rubber, cause the rubber mixture to adhere to the mixing rolls on account of the residual solvent content. Although the resin can still be isolated in solvent-free form from relatively small reaction vessels up to 0.2 m³ in volume by virtue of the fairly low temperature stressing applied during direct concentration by evaporation, it can no longer be isolated from larger industrial reaction vessels for the reasons explained above.

Where the reinforcing resin solution is continuously concentrated by evaporation in an evaporation screw of economically acceptable size (throughput: 80–500 kg/h; residence time: 15–30 minutes), the resins obtained also do not have the optimal properties of a reinforcing resin isolated after brief thermal stressing from a smaller evaporation screw (throughput: 1–10 kg/h). If it is desired to isolate solvent-free resins by this process, partially crosslinked products, which do not completely melt on incorporation into the rubber (speck formation) and which are not homogeneously dispersed in the rubber matrix, are always obtained. Accordingly, the hardened rubber materials show reduced hardness and poor structural strength.

In order to obtain uncrosslinked resins which can be homogeneously incorporated into the rubber and melted by this process, it is necessary to forego complete evaporation of the solvent. The resins thus obtained have low softening points (40°–60° C., as determined in accordance with DIN 53180), cause problems of adhesion upon incorporation into the rubber and give hardened rubbers of reduced hardness. In the event of prolonged storage, resins such as these sinter together so that they are difficult to process.

An object of the present invention is to provide a process which enables the resins to be isolated and prepared for processing from solution, the resins being intended to be provided with the following optimal properties:

1. The resin is intended to impart high temperature-stable hardness values to the hardened rubber materials.
2. The rubber materials hardened by incorporation of the resin are intended to show high structural viscosities.
3. The resins are intended to be universally workable into various synthetic rubbers, such as NBR, SBR, EPDM, BR, CR, and also natural rubber at a processing temperature in the range of from 70° to 120° C., preferably in the range of from 80 to 100° C. to form hardened rubber materials having the advantageous properties mentioned in 1. and 2.
4. The resins are intended to melt within the above-mentioned processing temperature range and to be able to be homogeneously dispersed in the rubber matrix without causing any adhesion to the mixing rolls.

In order optimally to achieve these properties, it was necessary to find a method for working up the resin solution which enables the added boron compound to be condensed substantially completely into the novolak base of the resin and the solvent to be quantitatively removed without causing a condensation reaction progressing to the point of partial crosslinking of the resin through prolonged thermal stressing.

Accordingly, an object of the present invention was to find a working-up process which enables the parameter of residence time to be made adjustable through the parameters of temperature and pressure in such a way that the resins obtained by the working-up process according to the present invention show the significant advantageous properties mentioned above under 1. to 4. and also in such a way that these resins are not exposed during working up to any influences capable of damaging their positive properties.

According to the present invention, this object may be achieved by concentrating the resin solution by evaporation in a coiled reaction and evaporation tube, hereinafter referred to in short as a spiral flow evaporator, having a certain ratio according to the present invention between throughput and flow cross-section, hereinafter referred to as A, and a certain ratio according to the present invention between throughput and heat-transfer surface, hereinafter referred to as B.

Accordingly, the present invention relates to a process for isolating boron-containing phenol/formaldehyde resins from their reaction media which, in addition to the end product, also contain starting material and solvent, characterised in that isolation is carried out by concentration through evaporation in spiral flow evaporator which has the following characteristics:

$$A \text{ which represents } \frac{\text{throughput}}{\text{tube cross section}} \quad \frac{\text{kg}}{h \cdot mm^2}$$

is from 0.1 to 1.5, preferably from 0.2 to 0.5 and $$B \text{ which represents } \frac{\text{throughput}}{\text{evaporation surface}} \quad \frac{\text{kg}}{h \cdot mm^2}$$

is from 100 to 400, preferably from 150 to 300.

In the event of deviation from these ratios, resins which do not have the required optimal properties 1. to 4. are obtained. If the ratio B selected is too low for a constant ratio A, i.e. for a constant flow velocity, the resin obtained, although having a high boron content, has an excessively high degree of crosslinking in consequence of the thermal stressing applied during concentration by evaporation. If the ratio B selected is too high for a constant ratio A, evaporation is incomplete and the boron content of the resin is too low, so that the product essentially corresponds to the product of incomplete concentration by evaporation in a vessel.

Evaporation may also be carried out in the presence of an inert gas, such as nitrogen or carbon dioxide, introduced into the evaporator. This is only necessary, however, in cases where superheating of the solution is to be avoided for reasons of product stability before the tubular coil. If superheating is possible, no inert gas need be added because the initial velocity is high enough for the limits for the permitted mean residence time to be observed. The build up of a substantially uniform pressure gradient over the entire length of the tube is essential for this purpose. For pressures in the range of from 5 to 500 mbar, preferably in the range of from 50 to 350 mbar, there is no need to use an inert gas. The temperature prevailing during working up of the resin in the spiral flow evaporator is normally in the range of from 140° to 240° C., but preferably in the range of from 170° to 215° C. The mean residence time is from 5 to 120 seconds, preferably from 10 to 40 seconds. The velocity of the gases formed from the solvent vapour and the vapour of the monomers formed during working up by incorporation of the boric acid alkyl esters through esterification amounts to from 30 to 200 m/sec. In extreme cases, it reaches the speed of sound at the evaporator exit.

This vapour acts simultaneously as a carrier vapour for the resin melt and thus enables the liquid resin to be rapidly transported through the spiral flow evaporator in the specifically short residence times characteristic of the process according to the present invention which are determined by the dimensions of the apparatus.

Because of the short residence time in the spiral flow evaporator, the thermal stressing to which the reactive resin is subjected during working up is kept so low that undesirable crosslinking reactions take place to only a minimal extent, if at all, and the reinforcing resin obtained, although free from solvent, is highly reactive by virtue of the trifunctional boric acid alkyl-novolak ester groups.

65 to 90% by weight solutions of the boron-containing phenol/formaldehyde resins are preferably subjected to the isolating process according to the present invention.

Where the resin is concentrated by evaporation in a reaction vessel or in a screw, from 12 to 20% by weight of the boric acid ester compounds used are recovered in the distillate. The brief, but relatively high temperature stressing which is possible in the spiral flow evaporator provides for better reaction of the boric acid ester components added with the novolak so that the distillate accumulating contains from only 6 to 10% by weight of the boric acid esters used and the reinforcing resins thus obtained develop optimal hardening activity in the rubber materials hardened therewith.

The working process according to the present invention is also advantageous in regard to the ready controllability of the product properties by means of the vacuum applied. Since the amount of vapour accumulating, its velocity and, hence, the transport velocity of the liquid resin are determined by the vacuum applied for a constant temperature and a constant throughput, the residence time of the resin in the evaporator is thus also regulated for certain constant apparatus dimensions.

Thus, the product properties of the resin may be significantly determined and optimally regulated simply by varying the pressure applied during working up. This is not possible by any of the known working up processes over a sufficiently narrow residence time range.

The working up process according to the present invention using a spiral flow evaporator having the above-mentioned constants enables the highly reactive phenol/formaldehyde resins modified with boric acid esters which are active as reinforcing resins for rubbers by virtue of their high hardening activity to be economically isolated from their solutions at high throughput levels. One type of apparatus which may be used for carrying out the process according to the present invention is shown in the accompanying drawing.

The approximately 75% by weight resin the receiver 1 heated to 80°–120° C., preferably to 80°–100° C., to the coiled reaction and evaporation tube 3 by the pump 2. After the pump but before the spiral flow evaporator, the temperature of the resin solution is 170°–220° C., preferably 190°–210° C., the pressure at the end of the spiral flow evaporator being adjusted to 50–500 mbars, preferably to 100–300 mbars. The resin melt concentrated by evaporation is pumped (by pump 5) from the cyclone 4 to a cooling stage and then to a suitable apparatus where it is prepared for processing (cooling roller or pelletising belt), while the solvent vapours are delivered to a condenser 6. The condensate is run off through the pipe 7. The pump 8 generates the vacuum.

The dimensions of the spiral flow evaporator used for carrying out the resin-isolating process according to the present invention which are dependent on the throughput and which are required for obtaining reinforcing resins of suitable, optimal quality are indicated by way of example in the following Table:

| Throughput kg/h (75% by weight resin solution) | A $[\frac{kg}{h \cdot mm^2}]$ | B $[\frac{kg}{h \cdot mm^2}]$ |
|---|---|---|
| 40 | 0.226 | 190 |
| 100 | 0.25 | 200 |
| 1000 | 0.333 | 222 |
| 1330 | 0.333 | 240 |

The resin solution on which the following Examples are based was obtained as follows in accordance with German Offenlegungsschrift No. 2,557,613.

The "primary resin" accumulating in the production of bisphenol A (a polynuclear phenol mixture of bisphenol-A-isomers with hydroxy phenyl-hydroxy indane and hydroxy phenyl-hydroxy chromane isomers in a ratio by weight of approximately 7:1:1) is introduced into the reaction.

890 kg of "primary resin" are dissolved in 200 kg of isobutanol and the pH of the resulting solution is adjusted to a value of 2 by the addition at 80° C. of 35 kg of 85% by weight phosphoric acid and 2 kg of p-toluene sulphonic acid. After filtration through a pressure filter, 220 kg of 30% by weight formalin and 97 kg of the unsaturated fatty acid "edenor UKD" (a product of Henkel, Düsseldorf, Germany) are simultaneously added, accompanied by heating to boiling point with stirring in a nitrogen atmosphere (internal temperature: 97° C.). After a reaction time of 1 hour, 190 kg of water are azeotropically distilled off, the internal temperature rising to 127° C.

300 kg of a separately prepared liquid boric acid isobutyl ester anhydride of the following composition:

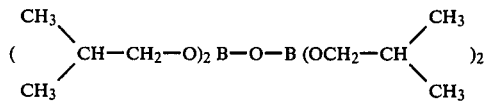

are introduced into the reaction mixture, after which 80 kg of isobutanol and 10 kg of water are distilled off, the internal temperature of the reaction mixture rising to 147° C. the resin solution ready for working up has a solids content of approximately 75% by weight. The process according to the present invention is illustrated by the following Examples in which all the percentages are used on a weight basis unless otherwise indicated.

EXAMPLE 1 (Comparison Test)

Working up of the reinforcing resin solution by concentration through evaporation in a reaction vessel:

150 kg of the resin solution were concentrated while stirring at a temperature rising to 150° C. first under normal pressure and then under reduced pressure (up to 400 mbars), 28 kg of distillate being obtained. The liquid resin was run off.

Boron content of the distillate: 1.9%

Softening point of the resin (according to DIN 53180): 63° C.

Boron content of the resin: 1.6%.

The resin sintered on grinding. Where concentration by evaporation is carried out at a temperature above 150° C. and below 180° C., crosslinked, infusible resins are obtained after the removal of 37 kg of solvent by distillation.

EXAMPLE 2 (Comparison Test)

Working of the reinforcing resin solution by concentration through evaporation in a screw:

100 kg of the resin solution were concentrated by evaporation in a 2-flight evaporation screw at a temperature rising to 155° C. and under a pressure of approximately 50 mbars. Quantity of distillate: 24 kg. The resulting resin was partly crosslinked and could not be homogeneously mixed in with the rubber on mixing rolls.

Where working up is carried out at a temperature of at most 130° C. and under a pressure of 46 mbars, a resin having the following characteristics is obtained:

Softening point (DIN 53180): 61° C.
Boron content of the resin: 1.6–1.7%.
Boron content of the distillate: 1.6%.
(Quantity of distillate: 20 kg/100 kg of resin solution).

EXAMPLE 3

Working up of the reinforcing resin solution by concentration through evaporation in a spiral flow evaporator having A=0.226 and B=190:

500 kg of the resin solution were worked up in a spiral flow evaporator (length 4.5 m, cross section Q=176 mm$^2$) at a temperature of 190° C. and under a pressure of 200 mbars (throughput: 40 kg of resin solution per hour).

Distillate: 122 kg.
Boron content of the distillate: 0.7%.
The resin obtained had the following characteristics:
Softening point (DIN 53180): 74° C.
Boron Content: 1.8–2.0%

We claim

1. A process for isolating boron-containing phenol/formaldehyde resins from their reaction media which, in addition to the end product, also contains starting compounds and solvents used, characterised in that isolation is carried out by concentration through evaporation in a spiral flow evaporator which has the following characteristics:

$A$ which represents $\dfrac{\text{throughput}}{\text{tube cross section}}\ \dfrac{\text{kg}}{\text{h}\cdot\text{mm}^2} =$ from 0.1 to 1.5 and $B$ which represents $\dfrac{\text{throughput}}{\text{evaporation surface}}\ \dfrac{\text{kg}}{\text{h}\cdot\text{mm}^2} =$ from 100 to 400.

2. A process as claimed in claim 1, characterised in that the characteristics of the spiral flow evaporator are as follows:
A=from 0.2 to 0.5 and
B=from 150 to 300.

3. A process as claimed in claim 1 or 2, characterised in that the isolation process is carried out at a temperature in the range of from 140° to 240° C.

4. A process as claimed in claim 1, characterised in that the isolation process is carried out at a temperature in the range of from 170° to 215° C.

5. A process as claimed in claim 1, characterised in that the mean residence time of the resin in the spiral flow evaporator amounts to from 5 to 120 seconds.

6. A process as claimed in claim 1, characterised in that the mean residence time of the resin in the spiral flow evaporator amounts to from 10 to 40 seconds.

7. A process as claimed in claim 1, characterised in that evaporation is carried out in the presence of an inert gas.

8. A process as claimed in claim 1, characterised in that the spiral flow evaporator is under a pressure gradient of from 5 to 500 mbars.

9. A process as claimed in claim 1, characterised in that the spiral flow evaporator is under a pressure gradient of from 50 to 350 mbars.

* * * * *